3,103,973
CHEMICAL HEATING OF A WELL OR CAVITY
AND FORMATION ADJACENT THERETO
Eugene D. Mullen, Sand Springs, Okla., assignor to The Dow Chemical Company, Midland, Mich., a corporation of Delaware
No Drawing. Filed May 18, 1960, Ser. No. 29,788
7 Claims. (Cl. 166—25)

The invention is concerned with raising the ambient temperature about an aqueous hydraulic cement slurry which has been emplaced in a well or cavity in a subterranean formation while the slurry is setting to a hard monolithic solid.

Hydraulic cement as used herein refers to Portland and aluminous cements and particularly to classes A, B, C, D, E, F, and N as described in the American Petroleum Institute publication entitled API RP 10B and API Std. 10A.

In a number of instances where cementing operations are to be carried out below ground, e.g., in oil well cementing, the ambient temperature about the aqueous hydraulic cement slurry positioned in the formation during setting is definitely lower than that which is desirable. For the aqueous cement slurry to set to a solid of satisfactory compressive strength within the time which can conveniently be set aside for the cement to set (during which the well is closed in and any operations concerning it postponed) it is essential that the temperature be above the freezing point of water and in most instances that the temperature be at least about 10 Fahrenheit degrees above the freezing point of water. It is moreover highly desirable that the temperature be considerably greater than 10 Fahrenheit degrees above the freezing point of water, e.g., a setting temperature of from about 90° to about 140° or 150° F. Difficulties resulting from low ambient temperatures during the setting of aqueous hydraulic cement slurries are particularly severe in the higher altitudes and latitudes, e.g., in the Canadian permafrost region. With the opening up of underground operations at increasingly farther distances from the tropical areas of the earth, e.g., Alaska and possibly Antarctica, the need for a method of cementing off underground operations without the accompanying handicap of the bad effects of the cool ambient temperatures have become greater. Such situations exist in oil well drilling and oil production, mining and quarrying operations, tunnel and viaduct construction, and laying underground foundations for dams, retaining walls, and military emplacements.

The use of especially accelerated hydraulic cements have been used in attempts to overcome the undesirable effects of the low ambient temperatures. However, certain inherent disadvantages accompany the use of such cements. Among such disadvantages are difficulties in adjusting the composition to achieve a suitable setting time, obtaining a final set having satisfactory ultimate compression strength, providing the materials at acceptable costs, and the continued existence of ambient temperatures which are too low to permit effective cementation even when the accelerated cements are employed.

A need, therefore, exists for a convenient, readily available, and economical method of raising the ambient temperature about an aqueous hydraulic cement slurry, during setting, in a subterranean formation, to make possible the use of such cement slurry where such ambient temperature is undesirably low and to avoid the disadvantages associated with known attempts to perform satisfactory cementing jobs where the cement slurry is required to set surrounded by or adjacent to such low ambient temperature.

The invention, accordingly, is an improved method of effecting cementation in a wellbore, mine, or other opening in a subterranean formation and in portions of said formation adjacent to the wellbore or other opening comprising injecting an aqueous hydraulic cement slurry into the wellbore or opening and emplacing it at the desired level, wherein the ambient temperature of the wellbore and adjacent formation at the level of the thus emplaced slurry is heated by injecting down the wellbore or other opening an aqueous solution containing at least one chemical therein which generates heat of neutralization, heat of solution, or heat of dilution in sufficient amount to cause the cement slurry to set to a hard monolithic solid having good strength values at an accelerated setting rate.

Illustrative of chemicals to employ in cementing operations in a subterranean formation in accordance with the practice of the invention are aqueous solutions of the oxides and hydroxides of alkali metals, ammonium and alkaline earth metals, e.g., $Na_2O$, $K_2O$, $Li_2O$, $LiOH$, $NH_4OH$, $MgO$, and $GaO$, and oxides of phosphorus and sulfur, e.g., $P_2O_5$ and $SO_3$. Oxides of phosphorus and sulfur are most effective when admixed with an aqueous basic solution. Mixtures of aqueous solutions of both a base and an acid are particularly useful. The base employed is an alkali hydroxide. By the term herein is meant an hydroxide of ammonium, or an alkali or alkaline earth hydroxide. Corresponding carbonates may be employed if preferred. It is suggested that the acid employed have an ionization constant of at least about $1 \times 10^{-5}$. A mixture of aqueous solutions of NaOH and HCl is illustrative of a base and acid for use in the invention.

In the practice of the invention the aqueous heat-generating solution is injected into an earthen cavity in or adjacent to which cementing is to be done. Illustrative of the type of cavity contemplated is a wellbore. The heat-generating solution may be injected before, during, or following the injection of the aqueous cement slurry so long as it is maintained substantially separate from the aqueous cement slurry. This is accomplished most conveniently by either injecting the heat-generating solution first and then either removing it or forcing it into an adjacent portion of the formation prior to or while the cement slurry is being injected, or injecting the cement slurry first and then injecting the heat-generating solution which is maintained separately from the cement slurry but both are positioned in the cavity or formation in proximity to each other so that the heat from the solution is utilized in setting the cement.

A particularly satisfactory method of effecting cementation in a wellbore in accordance with the invention consists essentially of injecting the aqueous cement slurry, as by pumping, down the tubing or the casing thereof, which has either perforations therein or a space below the lower end thereof; placing a suitable movable plug in the tubing or casing above the cement slurry; pumping the aqueous heat-generating solution into the tubing or casing thereby forcing the plug down on top of the slurry; and thereafter applying force on the solution to push the plug and the cement slurry therebelow downwardly until the cement slurry has passed out beneath the casing or tubing or has passed outwardly through the perforations in the casing to the annular space exterior of the casing between the casing and the formation and therealong until it has reached the place desired. Pressure on the heat-generating solution above the plug can be transmitted to the solution by pumping water into the casing or tubing above the solution thereby forcing the slurry and the solution into position. Pressure changes, as recorded by a gauge in the line at ground level, show when substantially all the cement has entered the annular space. Injection is then stopped. Such a procedure positions the cement slurry outside the casing and the heating aqueous solution in the interior of the casing substantially opposite the cement slurry, the solution thereby providing the necessary heat to raise the temperature for satisfactory setting of the cement slurry.

Below in Table I are set forth some of the heats of neutralization plus heats of solution liberated by admixing one gallon of hydrochloric acid having the percent concentration therein set out and one gallon of aqueous sodium hydroxide solution at room temperature. The amounts of NaOH employed is about 5 percent in excess of the stoichiometric quantity required to react with the HCl. Such heats as shown in the table are made available for setting aqueous cement slurries when the mixtures are employed in the practice of the invention.

TABLE I

*Neutralization of Sodium Hydroxide and Hydrochloric Acid Plus Heat of Solution of NaOH*

| Number | One Gallon Aqueous Solution Containing Following Weight Percent of HCl | One Gallon of Aqueous Solution Containing Following Amount of NaOH in Pounds | Heat Liberated in B.t.u.[b] | Temperature Rise in °F.,[c] |
|---|---|---|---|---|
| 1 | [a] 10 | 1.02 | 1,003 | 121 |
| 2 | 15 | 1.55 | 1,452 | 173 |
| 3 | 20 | 2.11 | 2,106 | 219 |
| 4 | 25 | 2.71 | 2,695 | 262 |
| 5 | 30 | 3.31 | 3,289 | 300 |

[a] Pounds per gallon may be calculated as gram mole, if desired, e.g., 1 gallon of 10 weight percent of HCl=0.875 pound HCl or 10.9 gram moles and 1 gallon of aqueous solution containing 1.02 pound of NaOH=about 11.5 gram moles. Values for heats of neutralization and solution may be obtained from appropriate handbooks, e.g., the reaction between 1 gram mole of HCl and 1 gram mole of NaOH is 13.7 kg.-calories and the heat of solution of 1 mole of NaOH in water is 9.9 kg.-calories.
[b] B.t.u. values may be converted to kg.-calories by dividing the B.t.u. values by 3.968.
[c] This value includes temperature rise due to dissolution of the NaCl formed in the reaction.

The substantial amounts of heat which are liberated when NaOH is dissolved in water and when aqueous solutions of HCl and NaOH are intermixed, as shown in Table I, are illustrative of those available when such solutions are employed in heating the wellbore or other cavity and the adjacent portions of the formation to the desirable temperature for the setting of an aqueous hydraulic cement slurry in accordance with the invention.

As was shown in Table I, in the case of NaOH, the heat of solution alone, in the absence of an acid to produce heat of neutralization, is itself appreciable.

Below are set forth a few of the oxides and hydroxides together with the heat of solution produced. The amount of water for practical purposes was a slight excess over that necessary to dissolve completely all the solute. The temperature of the water before admixing the solute was room temperature.

TABLE II

*Compounds Useful in Chemical Heating of Ambient Medium in Cementing Operations*

| Compound: | Heat of solution (B.t.u. per pound) |
|---|---|
| CaO | 596 |
| $Li_2O$ | 1369 |
| $P_2O_5$ | 456 |
| KOH | 423 |
| $K_2O$ | 1452 |
| $K_2S$ | 376 |
| $Na_2O$ | 1614 |
| NaOH | 450 |
| $SO_3$ | 892 |

Table II shows that a number of oxides and hydroxides produce sufficient heat of solution to be used in the practice of the invention without the presence of an acid. Other oxides and hydroxides than the alkali metal, alkaline earth metals, and phosphorus or sulfur may also be employed but those of Table II represent the most practical ones to employ.

The following cementing operations were carried out in an oil field in accordance with the invention.

EXAMPLE 1

A wellbore having a diameter of a size to accommodate a 7.5-inch diameter casing had been drilled to a depth of 300 feet in the Medicine Hat Field, Alberta, Canada. It was desired to cement in place the 7.5-inch diameter casing extending to a depth just short of the 300-foot depth before resuming drilling. The average ambient temperature surrounding the casing was 26° F.

The casing was lowered into the hole and necessary preparations made for cementing the casing in place. For use in cementing, 930 gallons of an aqueous cement slurry, having a density of 15 pounds per gallon, was prepared by admixing the contents with 100 sacks of an API class A Portland cement (87.5 pounds of dry cement per sack) to a solution of 604 gallons of water, which had dissolved therein 175 pounds of calcium chloride as an accelerator. The water employed in the preparation of the aqueous cement slurry had a temperature of 32° F. prior to mixing. After mixing, the temperature of the slurry thus made was 38° F.

An aqueous solution for heating the ambient temperature about the aqueous cement slurry, after its emplacement in the well in accordance with the invention, was then prepared as follows: 700 pounds of NaOH were added to 294 gallons of water in a suitable container to make about 300 gallons of an aqueous NaOH solution. The temperature of the water prior to mixing was 32° F. The temperature of the aqueous NaOH solution immediately after mixing was 170° F. A tank containing 200 gallons of 28 percent hydrochloric acid, into which has been mixed 6.4 pounds of sodium arsenite as an inhibitor to acid attack and corrosion, was conveniently located at the well site. Pumping assemblies were connected separately to the hydrochloric acid solution and the NaOH solution and suitable pipes having gauges and valve control means therein for controlled pumping the two solutions simultaneously into the well through a Y-shaped well-head connection.

The aqueous cement slurry, prepared as described above, was then pumped down the well casing. A rubber plug was then inserted into the casing above the cement slurry. The hydrochloric acid solution and the aqueous NaOH solution were then simultaneously pumped down the well on top of the plug at a ratio of 1 gallon of the acid to 1.5 gallons of the sodium hydroxide solution. About 5 minutes were taken to pump the acid and NaOH solutions into the casing. The aqueous acid and sodium hydroxide mixture thus injected, forced the rubber plug down upon the aqueous cement slurry. After the mixture of sodium hydroxide and acid solutions were in the casing, water was pumped into the casing above the mixture at sufficient pressure to force the contents of the casing consisting of the aqueous cement slurry in the lower part, and the aqueous acid-sodium hydroxide mixture in the upper part of the casing, separated by the rubber plug, downwardly through the casing (the cement slurry being thence forced out beneath the lower end of the casing) until the rubber plug had reached the bottom of the casing as indicated by a slight rise in the pressure gauge reading. The aqueous cement slurry had been thereby forced outwardly around the lower end of the casing into the annulus between the casing and the wellbore and thence upwardly therein. At the time the rubber plug had reached the bottom of the casing, some cement slurry began to emerge from the annulus at ground level showing that the annulus was filled with cement slurry. (A total of sixty-three gallons of water had been required to be injected into the casing.) The cement slurry was thus shown to be in the annulus between the wellbore and casing, and to extend upwardly from the bottom thereof to ground level. The acid-sodium hydroxide mixture was at this time on the inside of the casing directly opposite the cement slurry so that the heat being liberated from the acid-sodium hydroxide mixture was conducted through the casing and maintained the temperature of the aqueous cement slurry substantially higher than the temperature would have been in the absence of the aqueous acid-sodium hydroxide solution. The temperature of the aqueous solution going into the well was about 195° F. The well, which was exerting a back pressure of 500 p.s.i., was then closed in. After an hour, the well was opened and a thermocouple, suspended from a supporting cable, was inserted into the aqueous solution in the well casing to avaluate the temperature for purposes of demonstrating the invention. The thermocouple was alternately raised and lowered to obtain temperature readings at 50, 100, 150, and 200-foot depths immediately after the well was opened and for each succeeding hour thereafter. (It is interesting to note that after only an hour the cement slurry had set sufficiently to permit the opening of the well which had been exerting a back pressure of about 500 p.s.i. in the fluid state without the cement slurry shifting.) Table III below shows the average readings of the thermocouple over a period of 9½ hours measured from the time the well was closed in.

TABLE III

| Average temperature in ° F. as shown by the thermocouple:[1] | Hours elapsing after closing in well |
|---|---|
| 90.5 | 1 |
| 84.5 | 2 |
| 79.0 | 3 |
| 76.0 | 4 |
| 73.5 | 5 |
| 72.0 | 6 |
| 68.0 | 7 |
| 64.0 | 8 |
| 59.0 | 9 |
| 57.0 | 9.5 |

[1] The thermocouple was read at depths of 50', 100', 150', and 200'.

Reference to the first reading of Table III shows that the temperature of the mixture of acid and sodium hydroxide solution fell from about 195° F. to about 90.5° F. during the first hour, due to its first contact with the relatively cold formation and casing, but after the first hour it fell only about 30° over the following 8.5 hours.

After 14 hours, drilling was resumed. The rubber plug and cement remaining in the bottom of the well were first drilled through. The cement was found to be very hard and of a definitely permanent character.

Experience in similar wells in the area had shown that this same aqueous cement composition at the temperature of 38° F., which was the temperature of the aqueous slurry after preparation dropped to a temperature of about 34° F. after being pumped into the wellbore and, as a result of such low temperature, remained fluid for at least about 5 days and never acquired a compressive strength of over about 100 p.s.i. Such compressive strength is not satisfactory and a set cement which has no greater compressive strength than that cannot be employed successfully in well cementing operations. Furthermore, closing in a well for a period of up toward a week or longer is impractical.

Cementing the well in accordance with the invention produced a cement which, as stated, resisted movement at a back pressure of 500 p.s.i. after an hour and by independent tests could have permitted resumption of operations on the well after 4 hours. However, due to regulations which require a minium time of 24 hours to elapse between a well cementing operation and work on a well, drilling was not resumed until after 24 hours. At that time, as was aforestated, the drill bit cut through extremely hard cement in contrast to the soft cement which would have been encountered had the well been cemented according to conventional practice.

EXAMPLE 2

After the same well had been drilled to a depth of 1,534 feet, additional casing was required to be cemented in place. This cementing job was also carried out in accordance with the invention. The procedure was substantially that followed in Example 1 with such exceptions as are set out below.

At the time of the second cementing operation, both the average surface temperature and the bottom hole temperature were 40° F. When the acid and the sodium hydroxide solutions were mixed together, the resulting mixture had a temperature of 200° F. The extension of the open hole in the second drilling operation had been reduced to a diameter of 6 inches and the casing inserted therein, to be cemented in place, was 4.5 inches in diameter. Since the casing therein was thus reduced to 4.5 inches in diameter, it can be seen that the volume of cement in the casing to be positioned in the additional depth was definitely less per linear foot in contrast to the first treatment. Calculation shows the volume in the 4.5 inch casing to be roughly ⅓ the volume per linear foot of that employed in the 7.5 inch casing employed in the first treatment. A thermocouple was suspended in the aqueous acid-sodium hydroxide solution in the well and lowered therein to a depth of 1,700 feet, obtaining the temperature as it was lowered at the 100-foot depth and each additional 100 feet. Thereafter, at each successive half hour for 7 hours following injection of the cements slurry and heat-generation solution, the temperatures at each 100 foot depth were again obtained by alternately raising and lowering the thermocouple. The results of the thermocouple readings showed the temperature of the aqueous solution to be higher at levels nearer ground level: The highest temperature that was recorded at the end of the first half hour, that of 126°, being at the 100 foot level and the lowest temperature, that of 64°, being at the 1,700 foot level. During the course of the 7 hours, the higher temperatures, earlier obtained, fell off appreciably but the lowest temperature, earliest obtained, remained substantially constant, e.g., at the end of 4 hours the highest temperature recorded was 81° and the lowest temperature 61.5° F. and at the end of 7 hours the highest temperature recorded was 76.5° F. and the lowest temperature was 61° F.

The acid-sodium hydroxide solution was then pumped from the well and drilling resumed. The cement at the bottom of the well was hard and firm. Chips and cuttings from the drilling bit showed it to have high compressive strength.

EXAMPLE 3

A third example was run to ascertain the extent to which heat generated by the heat of solution of caustic in water accelerates the setting of a cement slurry deposited in a hole in a rock which was being subjected to the heat generated by such solution in accordance with the practice of the invention. An 11.5-inch diameter hole was drilled to a depth of 2 feet 10 inches in the center of a 2' x 2' face of a 2' x 2' x 3' block of limestone. An 8-inch diameter steel pipe, 2 feet 10 inches long, was centered in the hole and sealed at the bottom end with plaster of Paris. The block was placed in a trough of water in a cold room maintained at a temperature of 35° F. Water was circulated into the annulus between the pipe and the limestone block and permitted to overflow therefrom for 7 days in order to saturate the block with water while it was being cooled. A cement slurry was prepared by admixing 100 parts of API class A Portland cement, 2 parts of calcium chloride, and 46 parts of water to make a slurry having a density of 15.6 pounds per gallon. This is a composition commonly employed in well cementing jobs. All ingredients of the cement were admixed at a temperature of 35° F. The cement slurry thus made was poured into the annulus space between the steel pipe and the block. Thereafter, a 20 percent by weight sodium hydroxide solution was admixed with water (at 35° F.) and poured into the 8-inch diameter pipe. The temperature of the solution thus made was 140° F.

Three thermocouples were suspended about 1 foot from the top face of the limestone block in the aqueous cement slurry in the annulus between the pipe and face of the limestone block which simulates a limestone subterranean formation. Readings on the thermocouples were taken each successive hour for 9 hours at points adjacent to the pipe containing the heat-generating solution, midway between the pipe and the limestone "formation," and adjacent to the limestone "formation." The successive hourly temperature readings are set out in Table IV.

TABLE IV

| Average Temperature in ° F. as shown by Thermocouple Positioned in Aqueous Cement Slurry | | | Time in Hours After Pouring Slurry and NaOH Solution |
|---|---|---|---|
| Adjacent to Casing | Midway Between Casing and Formation | Against Formation Face | |
| 97 | 70 | 48 | 1 |
| 89 | 71 | 56 | 2 |
| 82 | 70 | 57 | 3 |
| 79 | 69 | 58 | 4 |
| 78 | 69 | 58 | 5 |
| 76 | 68 | 59 | 6 |
| 72 | 66 | 57 | 7 |
| 69 | 62 | 57 | 8 |
| 64 | 61 | 56 | 9 |

The thermocouple readings show that the heat from the sodium hydroxide solution, having an original temperature of 140° F., was conducted through the pipe and into the cement slurry raising the temperature of the cement slurry. As shown by Table IV, the temperature was raised from 35° F. to at least 56° F. in the cooler portion of the slurry and to 64° F. in the warmest portion of the slurry. It also shows that the temperature of the slurry tended to become uniform during the 9 hours that the temperatures were taken.

The cement thus made was tested with a Vicat needle four hours after it was poured. The Vicat needle test showed the cement to have fully set in accordance with the test at that time. Such rapid and complete set showed the method of the invention to be highly satisfactory for cementing pipe in place in a formation.

For purposes of comparison, Example 3 was repeated except that no aqueous solution of sodium hydroxide, or other heat-generating solution, was employed. The temperature of the cement slurry when poured was 35° F. as in Example 3. After 72 hours the cement had set but was soft and of insufficient strength to be satisfactory for use in wells.

A number of advantages are to be realized by the practice of the invention. The invention provides a highly satisfactory method of effecting cementation employing an aqueous hydraulic cement composition in subterranean cementing operations. It provides a particularly valuable method of cementing in the colder regions of the earth. It offers a readily acceptable, convenient, and inexpensive method of accelerating the setting of cements in well cementing operations anywhere where such acceleration is helpful, without concomitant undesirable effects.

Having described the invention, what is claimed and desired to be protected by Letters Patent is:

1. In a method of effecting cementation in a cavity in a subterranean formation employing an aqueous hydraulic cement slurry the improvement consisting of injecting into the cavity an aqueous solution containing at least one chemical selected from the class consisting of oxides and hydroxides of alkali metals, alkaline earth metals, ammonium, phosphorus, and sulfur which generates heat when in an aqueous medium to raise the temperature of the formation adjacent said cavity, removing substantially all the solution from the cavity, and thereafter injecting a settable aqueous hydraulic cement slurry into said cavity while the temperature of the adjacent formation remains raised to effect an acceleration of the setting time of said slurry.

2. The method of claim 1 wherein said chemical is an alkali hydroxide and said aqueous medium contains an acid having an ionization constant of at least $1 \times 10^{-5}$.

3. The method of claim 1 wherein said chemical is an oxide of sulfur and the aqueous medium contains a base dissolved therein.

4. The method of claim 1 wherein said chemical is an oxide of phosphorus and the aqueous medium contains a base dissolved therein.

5. In a method of effecting cementation in the borehole of a well penetrating a subterranean formation wherein an aqueous hydraulic cement slurry is pumped down the wellbore, the improvement consisting of pumping down the wellbore and spotting therein in the proximity of said cement slurry and adjacent to the formation where the cementation is to be effected, an aqueous solution of an acid and an hydroxide selected from the class consisting of alkali metal, ammonium, and alkaline earth metal hydroxides.

6. A method of cementing a well penetrating a subterranean formation consisting of admixing water with at least one chemical compound to form a solution which liberates heat when admixed with water to raise the temperature of said aqueous solution above that temperature desired for the ambient temperature about a cement slurry during setting, pumping an aqueous slurry of an hydraulic cement down the well, thereafter pumping the aqueous solution containing the heat-liberating compound down the well, forcing the cement slurry and said solution into position in the well, closing in said well until the aqueous cement slurry has set, and thereafter removing the aqueous solution containing the heat-liberating compound from the well.

7. In a method of cementing a well penetrating a subterranean formation, said well having a casing therein which permits communication between the interior of the casing and the annular space between the casing and face of the borehole of the well at a point below the level where cementation is to be effected, the improvement consisting of injecting an aqueous hydraulic cement slurry down the casing of the well, placing a movable plug in the casing, forcing down upon said plug an aqueous composition containing at least one compound which liberates heat in an aqueous medium, applying pressure to said composition to force the contents of the casing downward and to force the aqueous cement slurry out of the casing into said annular space and upward therein to the level where cementing is to be effected, and locating said composition interior of said casing substantially opposite said slurry, and maintaining the slurry and aqueous composition thus located for at least 1 hour.

References Cited in the file of this patent

UNITED STATES PATENTS

| | | |
|---|---|---|
| 2,163,449 | Owsley et al. | June 30, 1939 |
| 2,217,708 | Scaramucci | Oct. 15, 1940 |

OTHER REFERENCES

Glasstone: "Textbook of Physical Chemistry," D. Van Nostrand Co., Inc. (New York), 1940. (Page 191 relied on.)

Mellor: "Comprehensive Treatise on Inorganic and Theoretical Chemistry," published by Longmans, Green and Co. (New York), 1928. (Vol. 8, page 945 and vol. 10, page 344 relied on.)

Jones, P. H., and Berdine, Denis: "Factors Influencing the Bond Between Oil Well Cement and the Formation," Petroleum World, volume XXXVII, No. 6, June 1940. (Pages 42 and 57 relied on.)